UNITED STATES PATENT OFFICE.

GEORG F. HEYL, OF CHARLOTTENBURG, PRUSSIA.

IMPROVEMENT IN PAINT COMPOSITIONS AND PROCESSES FOR MANUFACTURING THE SAME.

Specification forming part of Letters Patent No. 172,737, dated January 25, 1876; application filed September 29, 1875.

*To all whom it may concern:*

Be it known that I, GEORG FRIEDRICH HEYL, of Charlottenburg, Prussia, have invented a new Composition for the Preservation of the Bottoms of Ships, of which the following is a specification:

My improved composition is made up of the following ingredients: Palm-oil, or oil of senegal, coloring matter, varnish, shellac, pyroligneous spirit or alcohol, gum-euphorbium, chloride of mercury, and arsenic.

These ingredients are compounded in the following manner, in about the proportions described: About ten parts of shellac and fifty parts of gum-euphorbium are first dissolved in about double the quantity of pyroligneous spirit or alcohol, and into this solution is stirred a heated mixture of about twenty parts each of varnish and palm-oil, or oil of senegal. After some time has elapsed, say thirty-six hours, about one hundred parts of coloring matter (hydrated protoxyde of iron or chromate of lead and paris-blue, for instance) and fifteen parts each of chloride of mercury and arsenic, the three being well mixed together, are added to the above ingredients. This composition will then be ready for use after being stirred for about twelve hours.

The above-mentioned proportions of the ingredients I have found productive of good results; but they may be varied according as circumstances may suggest.

I claim as my invention—

1. The above-described paint composition, consisting of the following ingredients: oil, coloring matter, varnish, shellac, alcohol, gum-euphorbium, chloride of mercury, and arsenic, in about the proportions set forth.

2. The process described of compounding the composition—that is, first dissolving the shellac and gum-euphorbium in alcohol, and stirring in a heated mixture of oil and varnish, then adding coloring matter with chloride of mercury and arsenic, as set forth.

In testimony whereof I have signed my name to this specification in the presence of two subscribing witnesses.

GEORG FRIEDRICH HEYL.

Witnesses:
GEORG KAPFKA,
AUGUST GREILICH.